United States Patent [19]
Collier et al.

[11] Patent Number: 5,453,314
[45] Date of Patent: Sep. 26, 1995

[54] SINGLE USE DISPOSABLE PROTECTIVE WEARING APPAREL

[76] Inventors: George W. Collier; Kevin G. Collier, both of 235 Ridgewood Dr., Mystic, Conn. 06355; Walter L. Varney, 51 W. Wood Dr., Waterford, Conn. 06385

[21] Appl. No.: 359,925

[22] Filed: Dec. 20, 1994

[51] Int. Cl.$^6$ ................................................ B32B 27/14
[52] U.S. Cl. ............... 428/198; 250/516.1; 428/213; 428/215; 428/220; 428/244; 428/249; 428/283; 428/284
[58] Field of Search ................... 428/198, 244, 428/249, 284, 283, 328, 311.9, 312.8, 317.9, 213, 215, 220; 250/516.1

[56] References Cited

U.S. PATENT DOCUMENTS

| | | | |
|---|---|---|---|
| 2,683,262 | 7/1954 | Foss | 2/2 |
| 2,855,603 | 10/1958 | Zito | 250/516.1 |
| 3,052,799 | 9/1962 | Hollands | 250/108 |
| 3,164,840 | 1/1965 | Reynolds | 2/2 |
| 3,394,260 | 7/1968 | Phipps | 250/108 |
| 3,416,157 | 12/1968 | Marder et al. | 2/40 |
| 3,441,063 | 4/1969 | Press et al. | 139/391 |
| 3,654,629 | 4/1972 | Crisman et al. | 2/49 |
| 4,107,373 | 8/1978 | Miller | 428/537.5 |
| 4,153,745 | 5/1979 | Hart | 427/244 |
| 4,223,064 | 9/1980 | Ballif, III et al. | 428/246 |
| 4,304,006 | 12/1981 | Swart | 2/79 |
| 4,632,860 | 12/1986 | D'Antonio et al. | 428/290 |
| 4,831,664 | 5/1989 | Suda | 2/2 |
| 4,860,382 | 8/1989 | Markwell | 2/82 |
| 5,082,707 | 1/1992 | Fazio | 428/43 |

Primary Examiner—James J. Bell
Attorney, Agent, or Firm—Albert W. Hilburger

[57] ABSTRACT

Wearing apparel for protecting the wearer against radioactive contamination is manufactured from single use disposable laminated material which comprises a first continuous layer of non-macerating hypoallergenic cellulosic material for contact with the wearer's skin and a second continuous layer of cellulosic material exposed to external contamination. The first and second layers are bonded together with a third contiguous layer interposed between them. The third layer is of a microporous adsorbent material allowing passage of body vapors from the wearer to the ambient region while restricting passage of liquid in the opposite direction. The laminated material exhibits a tensile yield strength of at least approximately 2,000 psi, a shear yield strength of at least approximately 1,000 psi, and an overall coefficient of heat transfer of at least approximately 2.75 BTU/hr.ft$^2$-°F. The microporous adsorbent material may be activated charcoal or hydrated alumina silicate. The first layer has an outer surface smoothness comparable to that of stationery to provide a tactile quality comfortable to the wearer. Preferably, the first and second layers together are between approximately 0.002 and 0.004 inches thick with a coefficient of heat transfer between approximately 0.075 and 0.150 BTU/hr-ft-°F. The third layer is between approximately 0.0001 and 0.001 inches thick with a coefficient of heat transfer between approximately 0.150 and 0.300 BTU/hr-ft-°F.

17 Claims, 1 Drawing Sheet

5,453,314

SINGLE USE DISPOSABLE PROTECTIVE WEARING APPAREL

BACKGROUND OF THE INVENTION

1. Field of the Invention

The present invention relates generally to wearing apparel intended for protection in a radioactive environment and, more particularly, to single use disposable protective wearing apparel for that purpose.

2. Description of the Prior Art

Radiation workers routinely wear double layers of anti-contamination protective wearing apparel in radiologically controlled areas. Such protective apparel comprises an underlayer of cotton and nylon clothing, usually worn directly over one's underclothes, with an overlayer of protective plastic outerwear.

The underlayer of the protective apparel is typically comprised of cotton and nylon coveralls, a cotton or cloth hood, cotton glove liners and latex surgical gloves. The overlayer typically comprises plastic coveralls, boots and hood, and rubber gloves and boots to protect the plastic boots and latex gloves from tears and abrasive damage. The degree of protection specified is dictated by anticipated radiological conditions in the work area as noted on Radiation Work Permits routinely issued by attendant radiological control technicians assigned to protect radiation workers. For example, eye goggles, face shields, aprons, lab coats, and the like, may be added to protective clothing requirements as required by work activities, such as filing, sanding, drilling, and the like, which could disturb and dislodge surface contamination deposits thereby posing a potential airborne contamination hazard to radiation workers which would necessitate additional respiratory protection.

Upon completion of work in radiologically controlled areas, radiation workers carefully remove their protective clothing so as to avoid skin contamination during removal. They place the plastic materials in one container designated for direct disposal as radioactive waste, and place cloth materials in another container designated for laundering and decontamination. Then they leave the immediate work area. During protective clothing removal, care is also taken to avoid the possibility for cross-contamination between "contaminated" plastic and rubber overlayer clothing articles and "clean" cloth underlayer articles.

Cotton and nylon fabric materials are normally laundered and decontaminated for reuse. However, fabric materials eventually become unusable for reuse due to wear, damage, or the inability to successfully decontaminate residual radioactive contamination. At that point, the clothing must be bagged in plastic, controlled as low level radioactive waste, compacted, and shipped off-site for permanent disposable at a radioactive waste burial site.

The current laundering operation employs a closed-cycle wash and rinse system to contain the resultant radioactive liquid waste, an industrial dryer adapted with high efficiency particulate air filters to prevent the release of airborne radioactivity to the laundry area, and continuous air sampling and effluent monitoring. In addition, temporary lead shielding must be strategically placed within the laundry room to protect personnel from system radiation hot spots. The operation results in costly radiological monitoring expenses, additional radioactive liquid waste from the wash/rinse cycles, reprocessing of the liquid waste to reduce radioactivity levels, and subsequent solidification prior to shipping off site. Following laundering, the clothing is radiologically screened by radiation technicians to verify decontamination prior to reuse.

Plastic and rubber clothing articles are then directly disposed of as low level radioactive waste following initial use because it is not practical to decontaminate plastic and rubber material. Contaminated plastic and rubber clothing are placed in fifty five gallon steel drums, hydraulically compacted to increase container densities and shipping weights, and transported off-site for permanent burial.

The prior art includes numerous examples of protective garments and fabrics. Typical of these are the patents to Markwell, U.S. Pat. No. 4,860,382 and to Suda, U.S. Pat. No. 4,831,664. In Markwell, the fabric is layered, one ply being a fire retardant woven fabric such as a nylon/modacrylic mixture said to possess good wearing capability. The Suda garment is similarly layered with both inner and outer layers being of synthetic, polymeric/copolymeric plastic material.

U.S. Pat. No. 4,107,373 to Miller discloses a chemical treatment to advantageously impart a flame retardant character to paper and paper products either at the pulp stage or at the finished stage for such products as crepe or tissue paper used for decorative purposes, toweling paper, cardboard, corrugated cardboard, and the like.

U.S. Pat. Nos. 5,082,707 to Fazio, 3,654,629 to Crisman et al., and 4,304,006 to Swart all disclose disposable items of absorbent material, a disposable beach towel in the first instance, a disposable bib in the second instance, and a disposable garment for use by toddlers in the third instance.

U.S. Pat. No. 4,632,860 issued Dec. 30, 1986 to D'Antonio et al. discloses a waterproof breathable coating applicable to a wide range of types of fabrics intended for prolonged direct contact with the skin.

It was in light of the foregoing prior art that the present invention was conceived and has now been reduced to practice.

SUMMARY OF THE INVENTION

According to the present invention, wearing apparel for protecting the wearer against radioactive contamination is manufactured from single use disposable laminated material which comprises a first continuous layer of non-macerating hypoallergenic cellulosic material for contact with the skin of the wearer and a second continuous layer of cellulosic material exposed to, and for protection against, external contamination. The first and second layers are bonded together in such a fashion that a third layer is interposed between them and is contiguous with them. The third layer is of a microporous adsorbent material allowing passage of gaseous body vapors from the wearer to the ambient surrounding region while normally restricting passage of liquid from the ambient surrounding region to the wearer. The material of the invention exhibits a tensile yield strength of at least approximately 2,000 psi, a shear yield strength of at least approximately 1,000 psi, and an overall coefficient of heat transfer of at least approximately 2.75 BTU/hr.ft$^2$-°F. The microporous adsorbent material may be activated charcoal or hydrated alumina silicate, for example. The first layer has an outer surface smoothness comparable to that of stationery to provide a tactile quality comfortable to the wearer.

The invention serves to reduce plant maintenance, operating, and radioactive waste packaging, and shipping and disposal costs associated with using double layers of conventional anti-contamination protective clothing. Such conventional clothing typically comprises an underlayer of reusable, that is, launderable, cloth coveralls and an overlayer of non-reusable, that is, plastic, clothing currently worn by radiation workers in nuclear power plants, waste-processing facilities and atomic weapon's production sites. Such reduction and savings are accomplished by substituting single use, lightweight, disposable paper protective clothing for routine work activities in radioactively contaminated areas.

Such single use, lightweight, disposable paper protective clothing will not totally eliminate the use of plastic coverails in all work applications. However, single use, lightweight, disposable paper protective clothing will substantially reduce the need for plastic coverails in the majority of routine maintenance, surveillance and operations activities in radioactively contaminated areas. Additional footwear, hand, face and eye protection will continue to be required where radiological conditions in the work area necessitate added protection. However, the predominant source of low-level radioactive waste generated by the overwhelming current use of double layers of anti-contamination protective clothing, comprising a cotton or nylon underlayer and plastic overlayer, will be substantially reduced.

The single use, lightweight, disposable, paper protective clothing of the invention is intended to provide equivalent contamination protection under comparable radiological conditions and allow efficient on-site incineration or shredding. Such single use disposable paper protective clothing will provide favorable heat transfer characteristics as necessary to allow the dissipation of body heat; strength and flexibility characteristics required to withstand normal industrial wear; water resistant qualities required to render the material impervious to liquids encountered under normal working conditions; and combustible qualities at high temperatures required to permit incineration.

This single use, lightweight, disposable paper protective clothing will eliminate the routine use of double layers of protective clothing in radiological areas; will increase worker comfort and productivity; will reduce cumulative worker radiation exposure as a result of spending less time in the work area based on improved worker performance; and will dramatically reduce the volume of low-level radioactive waste typically generated at nuclear facilities currently employing reusable cloth and non-reusable plastic protective clothing.

A primary object of the invention, then, is to provide single use, lightweight, disposable paper protective clothing which will substantially reduce the need for plastic coverails in the majority of routine maintenance, surveillance and operations activities in radioactively contaminated areas.

Another object of the invention is to provide such novel single use disposable paper protective clothing which will possess favorable heat transfer characteristics, be strong, flexible, water resistant, and combustible to permit incineration.

A further object of the invention is to provide such a novel construction of single use disposable paper protective clothing as will eliminate the routine use of double layers of protective clothing in radiological areas, increasing worker comfort and productivity, reducing cumulative worker radiation exposure, and dramatically reducing the volume of low-level radioactive waste typically generated at nuclear facilities employing conventional protective clothing.

Other and further features, advantages, and benefits of the invention will become apparent in the following description taken in conjunction with the following drawings. It is to be understood that the foregoing general description and the following detailed description are exemplary and explanatory but are not to be restrictive of the invention.

The accompanying drawings which are incorporated in and constitute a part of this invention, illustrate one of the embodiments of the invention, and, together with the description, serve to explain the principles of the invention in general terms. Like numerals refer to like parts throughout the disclosure.

DETAILED DESCRIPTION OF THE PREFERRED EMBODIMENTS

Figure 1:
FIG. 1 is a perspective view of a person wearing single use disposable wearing apparel embodying the present invention.
Figure 2:
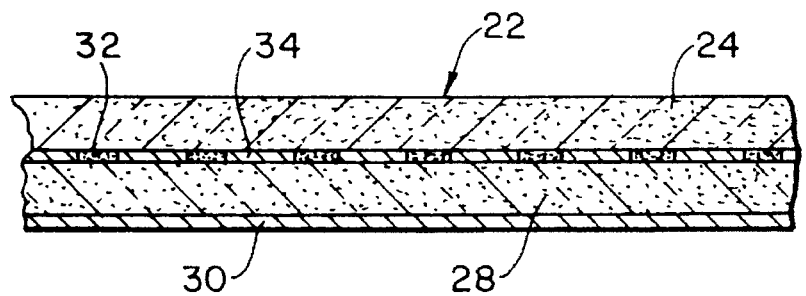
FIG. 2 is a cross section view taken generally along line 2—2 in FIG. 1.

Turn now to the drawings, to both FIGS. 1 and 2 which illustrate single use disposable wearing apparel embodying the present invention.

According to the invention, the person illustrated in FIG. 1 is provided with protective wearing apparel 20 of single use disposable laminated material 22 (FIG. 2). The material 22 comprises a first continuous layer 24 of non-macerating hypoallergenic cellulosic material for contact with the skin of the wearer. On its side which is in contact with the wearer's skin, the layer 24 has an outer surface smoothness comparable to that of stationery to provide a tactile quality or feel which is comfortable to the wearer.

The material 22 also comprises a second continuous layer 28, also of cellulosic material, which is exposed to, and intended for protection against, external contamination. The layer 28 is treated on its side subjected to potential radioactive contamination with a spray-on application film 30 of a water repellent chemical agent similar to SCOTCH-GARD® brand sealant.

Figure 3:
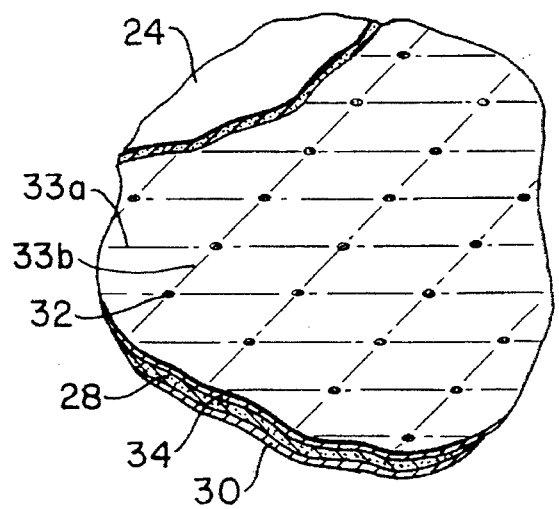
FIG. 3 is a detail perspective view illustrating a part of the construction of the material of the invention.

Viewing FIG. 3, the previously untreated sides of the innermost and outermost layers 24, 28 of the laminate material 22 may be bonded to one another with a compatible adhesive 32 intermittently applied along grid lines 33a, 33b following the application of a layer 34 (FIG. 2) of microporous adsorbent material. The layer 34 may be, for example, activated charcoal or hydrated alumina silicate applied to the mutually adjacent surfaces of the layers 24, 28. It will be appreciated that the layers 24, 28 may also be joined together in any other suitable manner. The adsorbent material of the layer 34 acts as a molecular sieve by allowing the passage of gaseous body vapors from the wearer to the ambient surrounding atmosphere, while restricting the passage of liquid molecules from the ambient surrounding atmosphere to the wearer, thereby protecting the wearer from contaminated liquids under normal working conditions.

The filtration capacity of the adsorbent material 34 can be controlled during the manufacturing process to maintain micropore size and distribution to within five angstroms, or less, in diameter, thus allowing size-selective separation of vapors and liquids. This will facilitate the transmissibility of body vapor to ambient while restricting the passage of liquids from ambient to the wearer. The breathable quality, strength, and heat transfer characteristics of the laminated material 22 will thus provide the optimum design characteristics for single use disposal protective clothing.

Natural or synthetic fiber floc may be added to the cellulosic layers 24, 28 of the laminated material 22 to increase the strength and tear resistance of the material. It is desired that the fiber-reinforced laminated material have an overall tensile yield strength of approximately 2,000 psi and a shear yield strength of approximately 1,000 psi. These values represent a conservative estimate of the strength of the material reasonably required to resist damage under normal, routine, working conditions.

It is also desired that the laminated material of the invention display an overall coefficient of heat transfer of at least approximately 2.75 BTU/hr.ft$^2$-°F. The heat transfer characteristics of the laminated material 22 are based on the following criteria:

- the need to maintain the wearer's skin surface temperature at 90° F. or less, to ensure wearer comfort;
- an ambient work space temperature of 80° F. or less sufficiently ventilated to provide a minimum film coefficient (h) on the external surface of the clothing equal to, or greater than, 3 BTU/hr-ft$^2$-°F.;
- work activity restricted to light work, for example, performing area walk-downs, equipment surveillance, overchecks, work-monitoring, and the like, in which body heat is generated at an estimated rate of 550 BTU/hr, or less;
- the body skin surface area of an average man is 20 ft$^2$; and
- a clothing overall coefficient of heat transfer (U) of 2.75 BTU/hr-ft$^2$-°F.

The body heat generated by a worker is convected and conducted to the inner surface of the clothing. The heat is then conducted through the clothing material to the outer surface of the material where it is convected and radiated to the ambient environment. In order to optimize heat transfer through the clothing, the overall coefficient of heat transfer (U) of the composite material is a critical consideration.

The basic equation used to describe the heat flow transmitted from the body, through the clothing, and to the atmosphere, that is, the heat flow through a composite sandwich with film, can be related by the following mathematical expression:

$$q = U A (T_s - T_\infty)$$

where:

- q=the heat rate for an average man engaged in light work in BTU/hr;
- U=the overall coefficient of heat transfer in BTU/hr-ft$^2$-°F.;
- A=the body skin surface area of an average man in Ft$^2$;
- $T_s$=the desired skin surface temperature of the wearer in °F.; and
- $T_\infty$=the ambient work space temperature in °F.

Solving for the overall coefficient of heat transfer (U) using the above design criteria:

$$U = q/A(T_s - T_\infty) = 550/(20)(90-80) = .75 \text{ BTU/hr-ft}^2\text{-°F.}$$

In order to achieve the required overall coefficient of heat transfer (U) above, the material thickness, (L), thermal conductivity (k) and minimum film coefficient (h) for each of the lamina in the composite has to be considered. The following formula relates the overall coefficient of heat transfer to each of the variables noted:

$$U = 1/(\Sigma L/k + 1/h).$$

Selection of material lamina thickness (L) and thermal conductivity (k) combinations to achieve an overall coefficient of heat transfer of 2.75 BTU/hr-ft$^2$-°F. will require a reiterative approach to material selection to satisfy the above design parameters.

For heat transfer analysis purposes, the composite in this application can be thought of as having three layers of material comprising two cellulosic-based layers (layers 24, 28) with an adsorbent (layer 34) sandwiched between them. The water retardant film or coating 30 on the external surface of the laminated material 22 has a negligible effect on the overall coefficient of heat transfer and is not considered in deriving the following preferred lamina thickness (L) and thermal conductivity (k) ranges.

During the reiterative approach in selecting a cellulosic-based material to satisfy an overall coefficient of heat transfer of 2.75 BTU/hr-ft$^2$-°F., it may be possible to eliminate the innermost layer of natural fiber intended to provide a textural quality or feel comfortable to the wearer. The innermost layer 24 of material in contact with the wearer, could have a smooth finish which would eliminate the need for any additional coating.

The inner surface of the composite material of the invention, that is, the surface in contact with the wearer's skin, is preferably dark in color in order to facilitate the dissipation of heat. The external surface of the laminated material 22 subject to the application of a water retardant, in turn, is preferably light in color to reflect thermal energy.

The following preferred lamina thickness (L) and thermal conductivity (k) ranges will satisfy the calculated overall coefficient of heat transfer for this application: layers 24, 28 to have a combined thickness, L, in the range of approximately 0.002 to 0.004 inches and a coefficient of heat transfer, k, in the range of approximately 0.075 to 0.150 BTU/hr-ft-°F. Similarly, layer 34 preferably has a thickness, L, in the range of approximately 0.0001 to 0.001 inches and a coefficient of heat transfer, k, in the range of approximately 0.150 to 0.300 BTU/hr-ft-°F.

In short, the single use, lightweight, disposable paper protective clothing will provide the following advantages over reusable, double-layer, cloth/plastic protective clothing:

- will significantly decrease the generation of low-level radioactive waste currently attributable, in large part, to the use of plastic overlayer protective clothing;
- will substantially decrease: operating and maintenance costs associated with reusable clothing laundry operations; wash/rinse cycle radioactive waste water disposal; radiation monitoring of laundry operations; radiation surveying of laundered clothing articles to ensure they are free of radioactive contamination prior to release for reuse;
- will improve radiation worker comfort levels by eliminating the use of heat-retaining plastic coveralls in routine work assignments
- will reduce cumulative personnel radiation exposure as a result of spending less time in work areas as a result of improved worker comfort and attendant productivity improvement;
- will lessen the environmental impact of radioactive waste disposal by reducing the amount of solid (plastic) and solidified (liquid) radioactive waste requiring permanent off-site burial.

Other clothing exists which will allow the escape of gaseous body vapors from the wearer and protect the wearer from liquid contaminants. Single use, lightweight, disposable paper protective clothing, however, will afford the same protection but is uniquely designed for disposability through incineration or shredding while woven clothing and plastic coverails impose formidable disposable requirements.

Potential applications for single use, lightweight, disposable paper protective clothing also exist in the chemical processing industry, hazardous industrial waste management area, environmental remediation work and the medical field.

The design of single use, lightweight, disposable paper protective clothing is based on applying basic engineering principles to a new product which will provide anti-contamination protection for radiation workers engaged in routine work activities in radioactively contaminated areas, while at the same time significantly reducing the volume of low-level radioactive waste generated at nuclear power plants, radioactive waste-processing facilities and atomic weapon's production sites. Whereas previously, protective garments were designed from the standpoint of wearability and long life for the garment, with all other considerations being secondary, the protective wearing apparel of the present invention has been considered from the standpoint of disposability. That is, the wearing apparel of the invention is intended to be used on one occasion only. With that concept being foremost, it turned out, surprisingly, that the resultant product was also of superior construction from the standpoint of suitability and comfort for the wearer.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. Single use disposable laminated material for making protective wearing apparel comprising:

a first continuous layer of non-macerating hypoallergenic cellulosic material for contact with the skin of a wearer;

a second continuous layer of cellulosic material exposed to, and for protection against, external contamination, said first and second layers being bonded together;

a third layer interposed between and contiguous with said first and second layers, said third layer being of a microporous adsorbent material allowing passage of gaseous body vapors from the wearer to the ambient surrounding region while normally restricting passage of liquid from the ambient surrounding region to the wearer;

said material exhibiting a tensile yield strength of at least approximately 2,000 psi, a shear yield strength of at least approximately 1,000 psi, and an overall coefficient of heat transfer of at least approximately 2.75 BTU/hr.ft$^2$-°F.

2. A single use disposable material as set forth in claim 1 wherein said microporous adsorbent material is activated charcoal.

3. A single use disposable material as set forth in claim 1 wherein said microporous adsorbent material is hydrated alumina silicate.

4. A single use disposable material as set forth in claim 1 wherein said first layer has an outer surface smoothness comparable to that of stationery to provide a tactile quality which is comfortable to the wearer.

5. A single use disposable material as set forth in claim 1 including:

adhesive means for bonding said first and second layers together.

6. A single use disposable material as set forth in claim 1 wherein said first and second layers are bonded together at intermittent locations on a grid pattern.

7. A single use disposable material as set forth in claim 5 wherein said adhesive means bonds said first and second layers together at intermittent locations on a grid pattern.

8. Wearing apparel for protecting the wearer against radioactive contamination manufactured from single use disposable laminated material comprising:

a first continuous layer of non-macerating hypoallergenic cellulosic material for contact with the skin of a wearer;

a second continuous layer of cellulosic material exposed to, and for protection against, external contamination, said first and second layers being bonded together;

a third layer interposed between and contiguous with said first and second layers, said third layer being of a microporous adsorbent material allowing passage of gaseous body vapors from the wearer to the ambient surrounding region while normally restricting passage of liquid from the ambient surrounding region to the wearer;

said material exhibiting a tensile yield strength of at least approximately 2,000 psi, a shear yield strength of at least approximately 1,000 psi, and an overall coefficient of heat transfer of at least approximately 2.75 BTU/hr.ft$^2$-°F.

9. Protective wearing apparel as set forth in claim 8 wherein said microporous adsorbent material is activated charcoal.

10. Protective wearing apparel as set forth in claim 8 wherein said microporous adsorbent material is hydrated alumina silicate.

11. Protective wearing apparel as set forth in claim 8 wherein said first layer has an outer surface smoothness comparable to that of stationery to provide a tactile quality which is comfortable to the wearer.

12. Protective wearing apparel as set forth in claim 8 including:

adhesive means for bonding said first and second layers together.

13. Protective wearing apparel as set forth in claim 8 wherein said first and second layers have a combined thickness, L, in the range of approximately 0.002 to 0.004 inches and a coefficient of heat transfer, k, in the range of approximately 0.075 to 0.150 BTU/hr-ft-°F.; and wherein said third layer has a thickness, L, in the range of approximately 0.0001 to 0.001 inches and a coefficient of heat transfer, k, in the range of approximately 0.150 to 0.300 BTU/hr-ft-°F.

14. A single use disposable material as set forth in claim 1 wherein said first and second layers have a combined thickness, L, in the range of approximately 0.002 to 0.004 inches and a coefficient of heat transfer, k, in the range of approximately 0.075 to 0.150 BTU/hr-ft-°F.; and wherein said third layer has a thickness, L, in the range of approximately 0.0001 to 0.001 inches and a coefficient of heat transfer, k, in the range of approximately 0.150 to 0.300 BTU/hr-ft-°F.

15. Protective wearing apparel as set forth in claim 8 including:

adhesive means for bonding said first and second layers together.

16. Protective wearing apparel as set forth in claim 8 wherein said first and second layers are bonded together at intermittent locations on a grid pattern.

17. Protective wearing apparel as set forth in claim 15 wherein said adhesive means bonds said first and second layers together at intermittent locations on a grid pattern.

* * * * *